(12) United States Patent  
Tiberghien et al.

(10) Patent No.: US 10,724,667 B2  
(45) Date of Patent: Jul. 28, 2020

(54) CIRCUIT BREAKER AND HANDLING FACILITY FOR PRESSURIZED FLUID COMPRISING SUCH A CIRCUIT BREAKER

(71) Applicant: STAUBLI FAVERGES, Faverges-Seythenex (FR)

(72) Inventors: Alain-Christophe Tiberghien, Sevrier (FR); Olivier Pastore, Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 16/123,283

(22) Filed: Sep. 6, 2018

(65) Prior Publication Data

US 2019/0086014 A1    Mar. 21, 2019

(30) Foreign Application Priority Data

Sep. 15, 2017 (FR) ...................... 17 58573

(51) Int. Cl.  
*F16L 37/42* (2006.01)  
*F16L 37/23* (2006.01)  
(Continued)

(52) U.S. Cl.  
CPC .............. *F16L 37/42* (2013.01); *B60K 15/00* (2013.01); *F16L 37/22* (2013.01); *F16L 37/23* (2013.01);  
(Continued)

(58) Field of Classification Search  
CPC ..... Y10T 137/87965; Y10T 137/87925; Y10T 137/87973; Y10T 137/87933;  
(Continued)

(56) References Cited

U.S. PATENT DOCUMENTS 3,130,749 A * 4/1964 Wittren .................. F16L 37/23  
137/614  
3,715,099 A * 2/1973 Shendure ................ F16L 37/23  
251/149.1  
(Continued)

FOREIGN PATENT DOCUMENTS

EP         707171 A1    4/1996  
EP         900966 A1    3/1999  
WO    2017099084 A1    6/2017

OTHER PUBLICATIONS

International Search Report for French Application 1758573, dated Apr. 27, 2018, 2 Pages.

*Primary Examiner* — Atif H Chaudry

(57) ABSTRACT

A circuit breaker for a facility for handling pressurized fluid includes a male element and a female element. The male element includes a male body defining a first inner pipe, having a member for closing off the front end of the first pipe from at least one first radial passage of a movable valve, and a locking notch arranged on the male body. The female element includes a female body defining a second inner pipe and provided with at least one radial passage, a movable valve and several locking members movable between a first radial position, for the axial locking of the male and female bodies in the coupled configuration, and a second radial position, where the locking members free the passage of the male body in the female body. In the coupled configuration, the radial passages are in communication, while sealing gaskets cooperate radially with male and female bodies.

17 Claims, 10 Drawing Sheets

(51) Int. Cl.
*F16L 37/22* (2006.01)
*F16L 37/35* (2006.01)
*B60K 15/00* (2006.01)
*F16L 55/10* (2006.01)
*F16L 37/32* (2006.01)
*F16L 37/36* (2006.01)
*B60K 15/03* (2006.01)

(52) U.S. Cl.
CPC .............. *F16L 37/32* (2013.01); *F16L 37/35* (2013.01); *F16L 37/36* (2013.01); *F16L 55/1015* (2013.01); *B60K 2015/03019* (2013.01); *F17C 2205/037* (2013.01); *F17C 2221/012* (2013.01); *F17C 2265/065* (2013.01); *Y10T 137/87925* (2015.04); *Y10T 137/87933* (2015.04); *Y10T 137/87965* (2015.04); *Y10T 137/87973* (2015.04); *Y10T 137/88054* (2015.04)

(58) Field of Classification Search
CPC ... Y10T 137/88054; F16L 37/36; F16L 37/32; F16L 37/42; F16L 37/23; B60K 15/00; F17C 2205/037
See application file for complete search history.

(56) References Cited

U.S. PATENT DOCUMENTS

| | | | |
|---|---|---|---|
| 4,398,561 A | 8/1983 | Maldavs | |
| 4,506,862 A * | 3/1985 | Spinosa | F16L 37/42 251/149 |
| 5,099,882 A * | 3/1992 | Smith, III | E21B 33/038 137/614.04 |
| 5,255,699 A * | 10/1993 | Herzan | F16L 37/23 137/1 |
| 2016/0290543 A1 | 10/2016 | Gatti | |

* cited by examiner

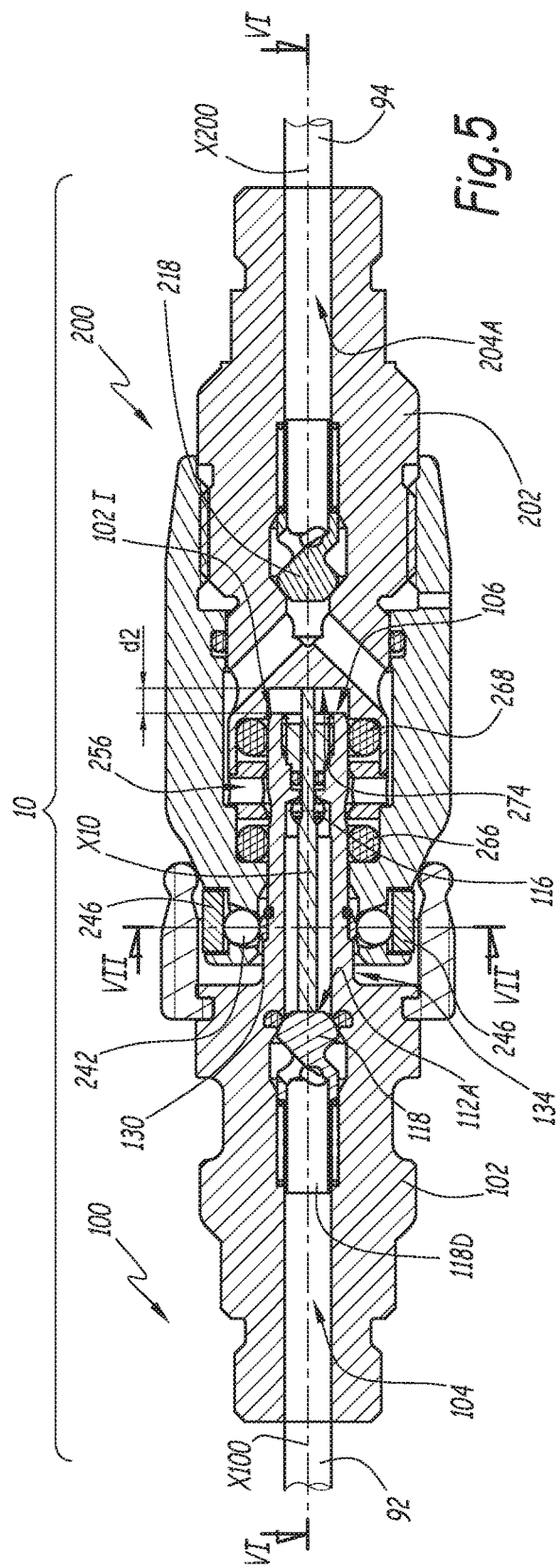
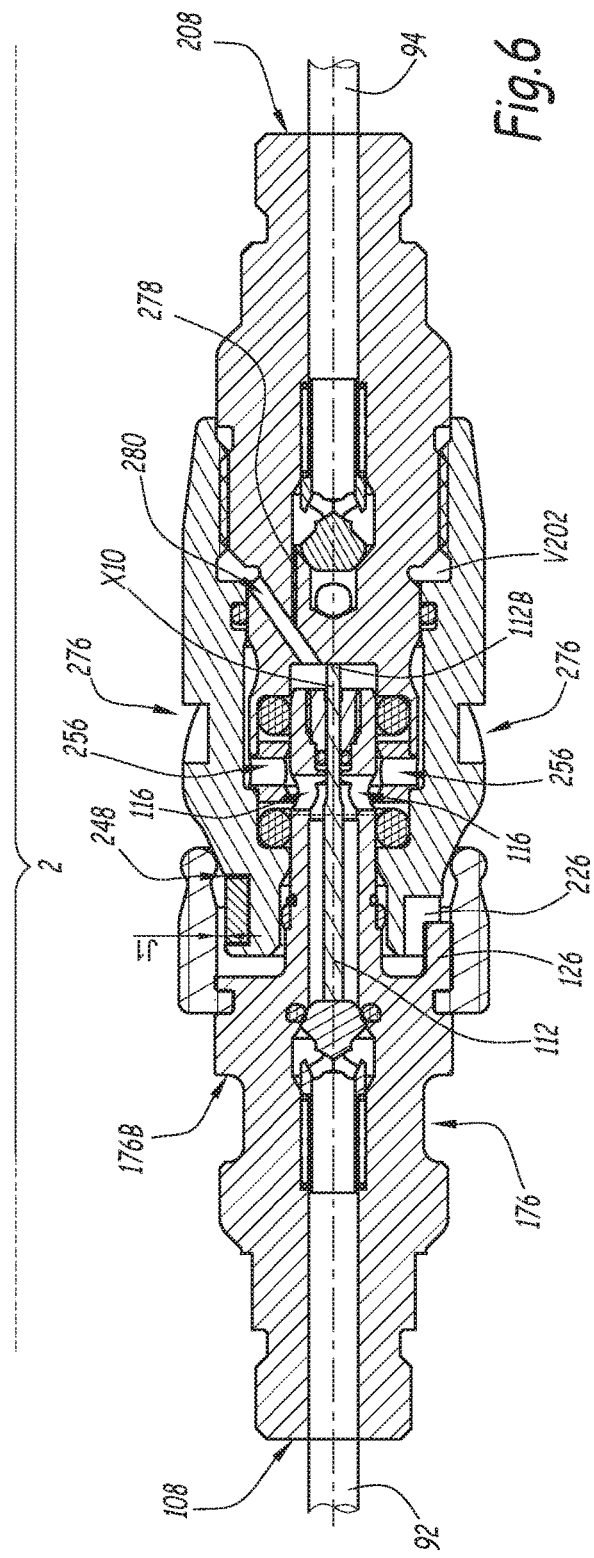

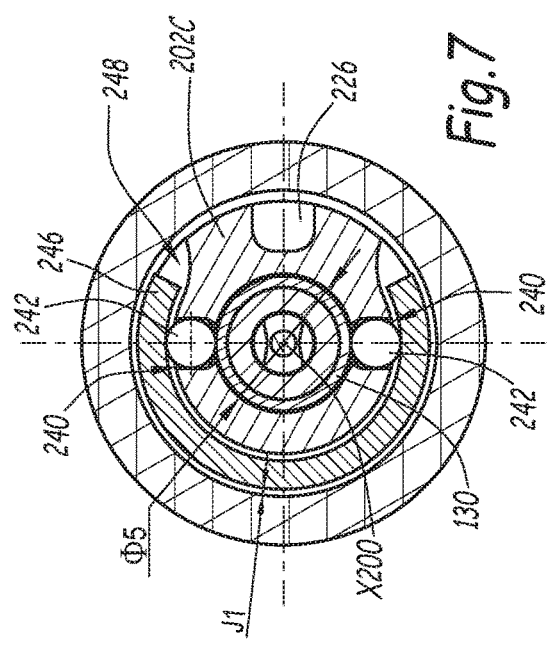
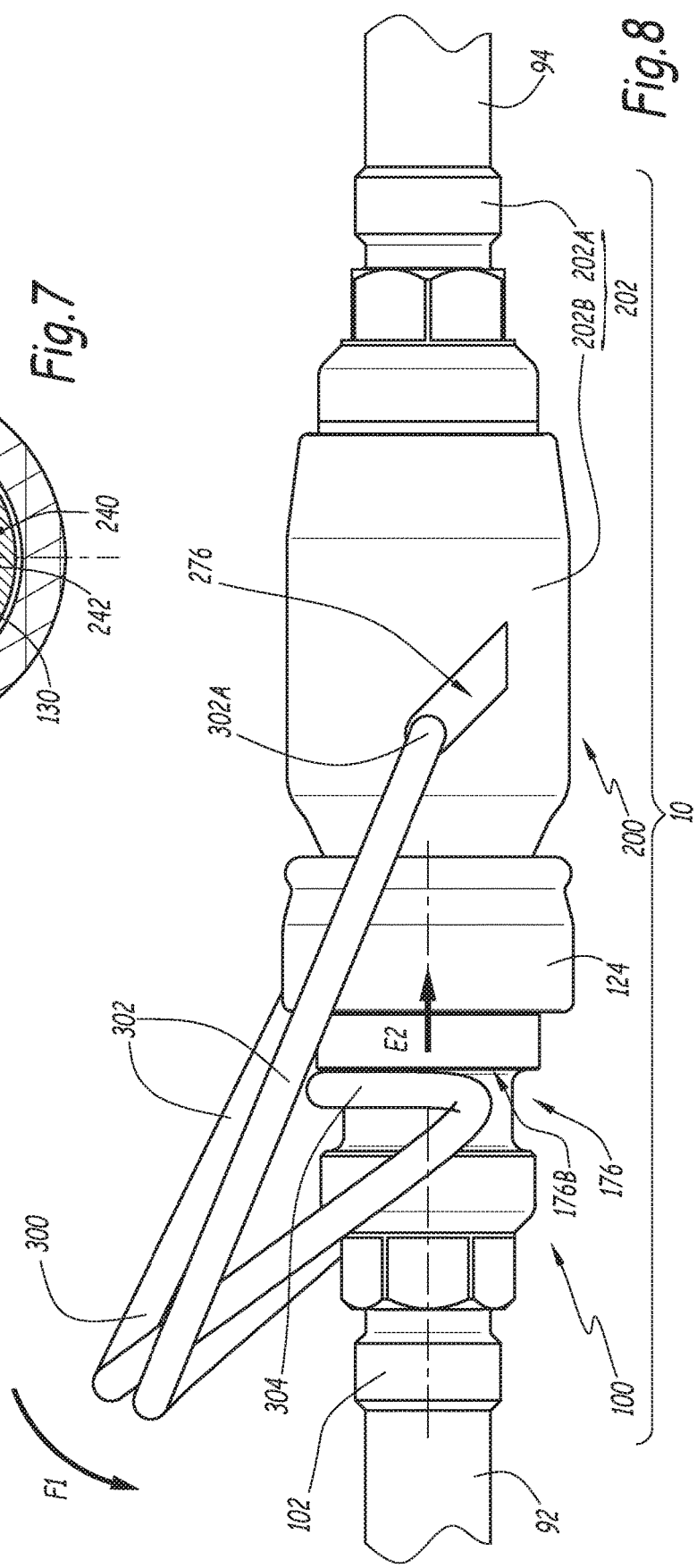

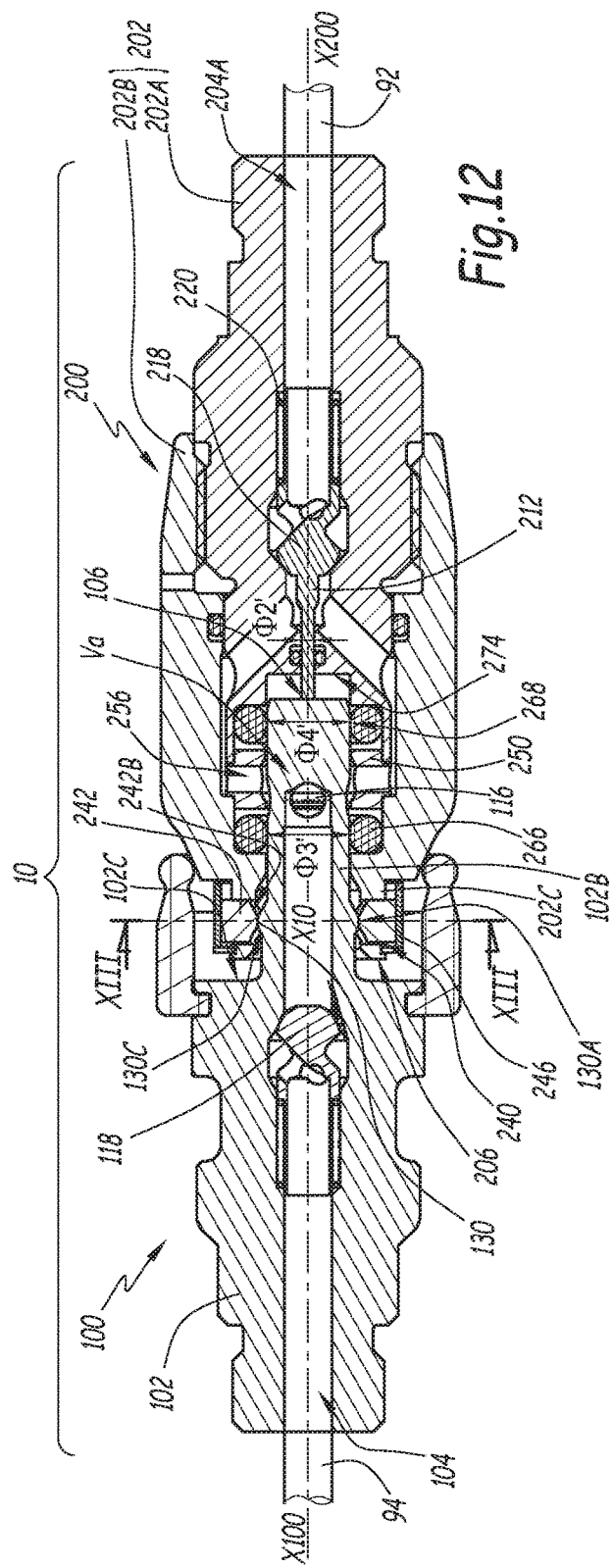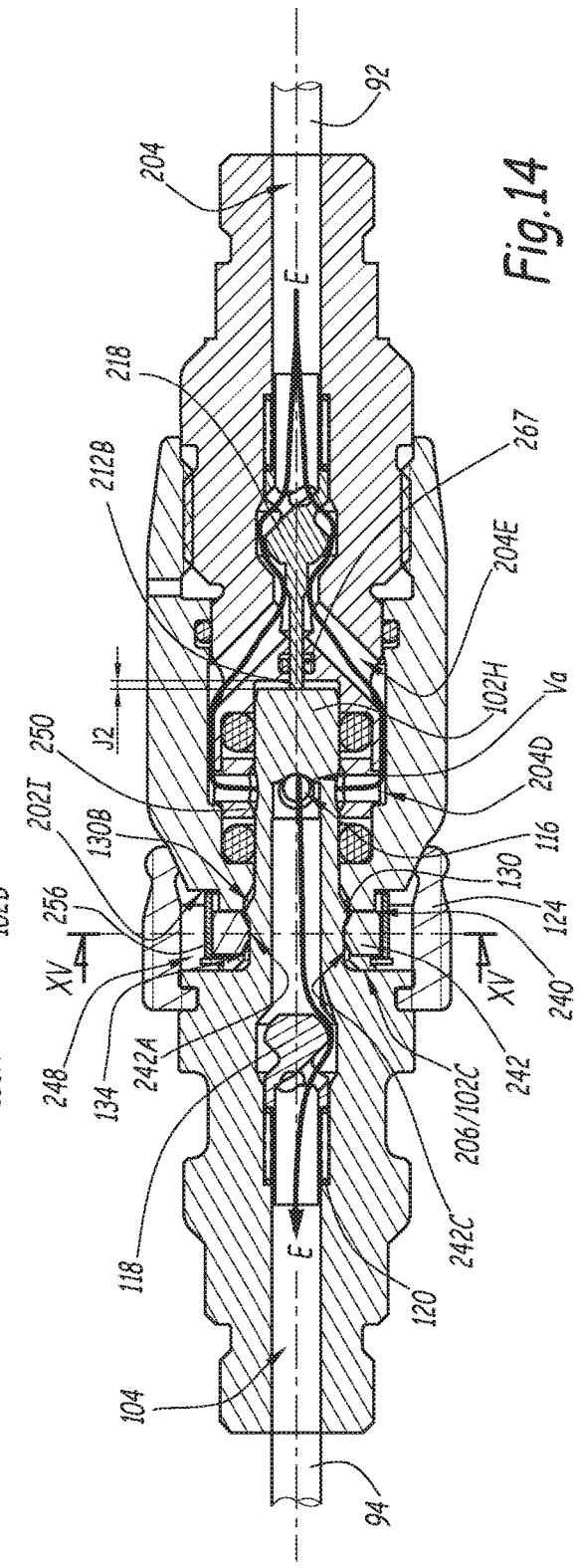

CIRCUIT BREAKER AND HANDLING FACILITY FOR PRESSURIZED FLUID COMPRISING SUCH A CIRCUIT BREAKER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The invention relates to a so-called "safety" circuit breaker, for a handling facility for pressurized fluid, such as a facility for filling a motor vehicle tank with pressurized hydrogen.

To prevent the time needed to fill a motor vehicle tank with pressurized hydrogen from being too long, it is known to use a high filling pressure, which may reach up to 875 bars. In light of this pressure level, the connection between the hydrogen source and the tank of the vehicle must be tight.

It is not possible to rule out an untimely movement of the tank of the motor vehicle during filling, such a movement being able to result from a poor immobilization of the vehicle or an incorrect maneuver by the user. Such a movement must not cause an alteration or an exposure to open air of the line connecting the pressurized hydrogen source to the tank of the vehicle.

Similar problems arise in other facilities for handling pressurized fluid, in particular a facility for filling a motor vehicle tank with pressurized methane.

To resolve this issue, it is known from EP-A-0,900,966 to insert, in a pressurized fluid circulation line, a circuit breaker that includes a male element connected to a first line portion and female element connected to a second line portion, these male and female elements being intended to fit in one another and to be locked by balls mounted on the female element and received in a peripheral notch of the male element. These balls are received in housings arranged in a slide movable axially relative to the female body and pushed toward the rear of the female body by a spring. This resilient return is compatible with the withdrawal movement of the male body in case of emergency uncoupling. When the male and female elements need to be fitted back in one another, after uncoupling, the slide must be pushed back against the axial force exerted by the spring. This maneuvering of the slide requires the use of a dedicated tool, then constituting a subassembly by locking a first part of the female element on the male element of the circuit breaker, before screwing a second part of the female element on the subassembly previously formed. This maneuvering, which is relatively complex and not intuitive, requires the user to master the use of the aforementioned tool. Furthermore, the resilient return force of the slide toward the configuration where it pushes the balls back so that they perform their locking function must account for the friction exerted on the body of the male element, during the screwing of the two parts of the female element on one another. Lastly, this known equipment has a large number of parts, including two series of balls and a relatively large spring. This circuit breaker is therefore relatively expensive and large.

The invention more particularly aims to resolve these drawbacks by proposing a new circuit breaker that is simpler, more compact and easier to maneuver than the known equipment.

To that end, the invention relates to a circuit breaker for connecting two line segments of a facility for handling pressurized fluid, the circuit breaker including a male element and a female element that are intended to fit in one another along a fitting axis. The male element includes a male body defining a first inner pipe for the circulation of pressurized fluid, this male body being provided with at least one member for closing off a front end of the first inner pipe along the fitting axis, at least one first passage, radial with respect to the fitting axis and connecting the first inner pipe the outside of the male body in the uncoupled configuration of the male and female elements of the circuit breaker, a valve, movable in the first inner pipe, and a locking notch arranged on the male body. The female element includes a female body defining a second inner pipe for the circulation of pressurized fluid and provided with at least one second passage, radial with respect to the fitting axis and connecting the second pipe to a volume receiving the male body in the female body, as well as a valve, movable in the second inner pipe. The female body is also provided with several locking members movable transversely with respect to the fitting axis in housings of the female body, between a first radial position, where the locking members are engaged in the locking notch, for the axial locking of the male and female bodies in the coupled configuration of the male and female elements of the circuit breaker, and a second radial position, where the locking members free the passage of the male body in the female body. In the coupled configuration, the first and second radial passages are in communication, while a first sealing gasket and a second sealing gasket arranged, along the fitting gasket, on either side of the first and second radial passages respectively cooperate radially with the male and female bodies. According to the invention, a resilient return ring is mounted on the female body and surrounds the locking members, this ring being configured to resiliently return the locking members toward their first radial position in the coupled configuration and to be deformed radially, and resiliently, by the locking members during their movement, from their first radial position toward their second radial position.

Owing to the invention, the circuit breaker, which may also be called "breakaway", is compatible with automatic locking and unlocking of its male and female elements, owing to a radial and centrifugal deformation of the resilient ring, this deformation resulting from the relative axial movement of the male and female elements. The locking of the male and female elements of the circuit breaker, obtained owing to a centripetal radial force of the resiliently deformable ring, is simple and intuitive to implement for a user, while being compatible with the high fluid pressures used in a pressurized fluid handling facility. This in particular results from the use of the first and second sealing gaskets, which are arranged on either side of the radial passages, including the radial passage of the male body and which make it possible to limit the effects of the pressure on the male body and therefore on the locking.

BRIEF SUMMARY OF THE INVENTION

According to advantageous but optional aspects of the invention, such a circuit breaker may incorporate one or more of the following features, considered in any technically allowable combination:
  The circuit breaker includes a rod for maneuvering a first valve from among the valve of the male element and the valve of the female element, this rod passing through a first body, formed by the male body or the female body and housing the first valve, with interposition of a third sealing gasket between the first body and the rod, and being mounted sliding in the first body along a direction parallel to the fitting axis, while the second body, from among the male body and the female body, defines a bearing surface of the rod, configured to push the rod toward the rear of the first body, during fitting of the male and female elements, to move the first valve from a closed position to an open position of the inner pipe of the first body.
  The rod is separate from the first valve that it maneuvers.
  In the uncoupled configuration and in the coupled configuration of the circuit breaker, the front end of the rod extends, along the fitting axis, toward the front past a surface of the first body that the rod passes through.
  In the coupled configuration, the first sealing gasket is arranged more in front of the female body than the second sealing gasket, while a sealing section between the second sealing gasket and the male body is equal to the sum of a sealing section between the first gasket and the male body and a sealing section between the third sealing gasket and the rod.
  The first sealing gasket and the second sealing gasket are each received in an inner peripheral groove of the female body and in that the rod actuates the valve of the male element.
  A first distance measured axially between the bearing surface and the gasket closest to the surface, among the first sealing gasket and the second sealing gasket is greater than a second distance measured axially between the front end of the outer radial surface of the male body and the front end of the rod, when the rod is in contact with the valve of the male element without separating it from its seat.
  The first sealing gasket and the second sealing gasket are O-rings, and for each of the first and second sealing gaskets, the ratio between, on the one hand, the inner diameter of this gasket in the uncoupled configuration of the circuit breaker, and on the other hand, the diameter of the toroid of this gasket is smaller than 2.5, preferably than 2.2.
  Between a first configuration of the resilient return ring in contact with the locking members in their first radial position and a second configuration of the resilient return ring in contact with the locking members in their second radial position, the resilient return ring is retained axially in a slot arranged at the outer radial surface of the female body and delimited by two axial edges. —The resilient return ring is a slotted ring that acts on two locking members movable in two symmetrical housings relative to the fitting axis.
  The resilient return ring surrounds the female body over 360°, around the fitting axis.
  The locking members are locking balls.
  The locking members are received in housings each centered on an axis transverse to the fitting axis, the transverse axes of the housings converge toward the front of the female body and an angle between the fitting axis and the transverse axis of each housing, measured on the rear side of the housing, is comprised between 60° and 80°, preferably equal to 70°.
  The locking notch is delimited, along the fitting axis, on the side of the front face of the male element, by a first frustoconical surface of a flange, while the incline angle of the first frustoconical surface relative to the fitting axis, measured outside the flange, is comprised between 140° and 160°, preferably equal to 150°.
  The male body is provided with a first outer notch, while the female body is provided with at least one second outer notch and these two outer notches are configured each to receive part of a tool to assist with the fitting of the male and female elements in one another.
  In the coupled configuration of the male and female elements, the female body constitutes an axial stop surface for the male body, in the fitting direction.

According to a second aspect, the invention relates to a facility for handling pressurized fluid that includes a pressurized fluid source as well as a first part of a coupling intended to be coupled to a second coupling part connected to a storage or usage volume of this fluid, the first part of the coupling being fluidly connected to the source by a line. According to the invention, a circuit breaker as mentioned above is fluidly connected to the source, by a first segment of the line, and to the first part of the coupling, by a second segment of the line.

Owing to the invention, this facility is easier to manufacture and easier to use than the known facilities.

Advantageously, the circuit breaker includes a rod for maneuvering the first valve from among the valve of the male element of the circuit breaker and the other valve of its female element, this rod is mounted sliding in a first body formed by the male body or the female body and housing the first valve, along a direction parallel to the fitting axis, with interposition of a third sealing gasket between the first body and this rod, while the element of the circuit breaker equipped with this rod is fluidly connected to the pressurized fluid source, by the first line segment.

BRIEF DESCRIPTION OF THE SEVERAL VIEWS OF THE DRAWING

The invention will be better understood, and other advantages thereof will appear more clearly, in light of the following description of two embodiments of a circuit breaker and equipment according to its principle, provided solely as an example and done in reference to the appended drawings, in which:
FIG. 5 is a longitudinal sectional view of the circuit breaker during coupling;

FIG. 6 is a longitudinal sectional view along line VI-VI in FIG. 5;

FIG. 7 is a cross-sectional view along line VII-VII in FIG. 5;

FIG. 8 is a side view of the circuit breaker during coupling;

FIG. 12 is a longitudinal sectional view, similar to FIG. 5, of a circuit breaker according to a second embodiment, during coupling;

FIG. 14 is a longitudinal sectional view of the circuit breaker of FIGS. 12 and 13, in the coupled configuration.

DETAILED DESCRIPTION OF THE INVENTION

Figure 1:
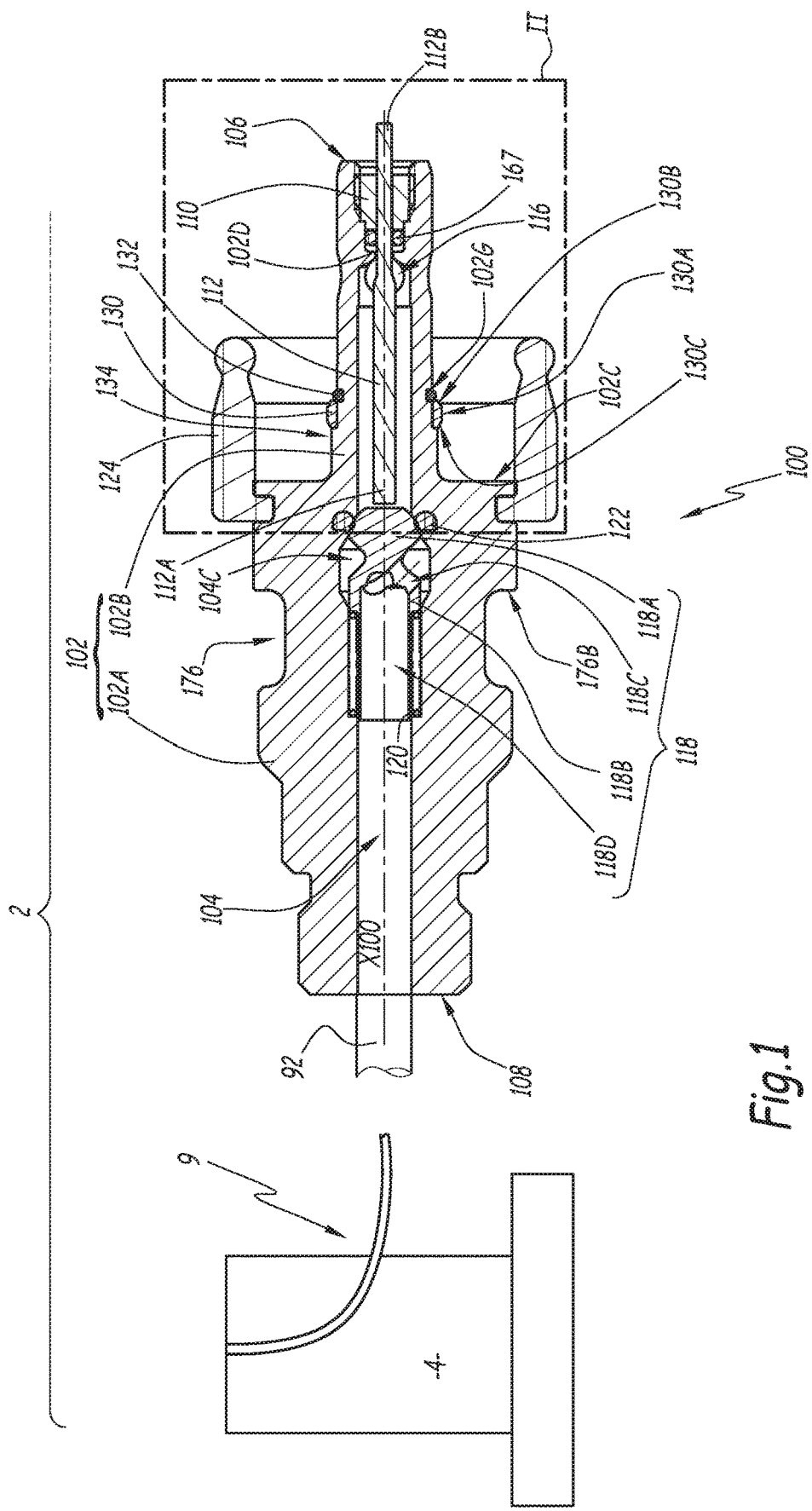
FIG. 1 is a longitudinal sectional block diagram of a male element of a circuit breaker according to the invention, this male element being connected to a pressurized fluid source.

A facility 2 for handling pressurized fluid is shown in FIGS. 1 to 11. It includes a terminal 4 that forms a pressurized fluid source as well as a gun 62 that makes up a first part of a coupling 6, the complementary part 64 of which is mounted on a motor vehicle 8 the includes an onboard tank 82 for storing a pressurized fluid and that can be coupled to the gun 62. A line 9 connects the terminal 4 to the gun 62. A safety circuit breaker 10 is inserted along the line 9 and divides the latter between a first upstream segment 92, which extends between the terminal 4 and the circuit breaker 10, and a second downstream segment 94, which extends between said circuit breaker 10 and the gun 62.

Figure 9:
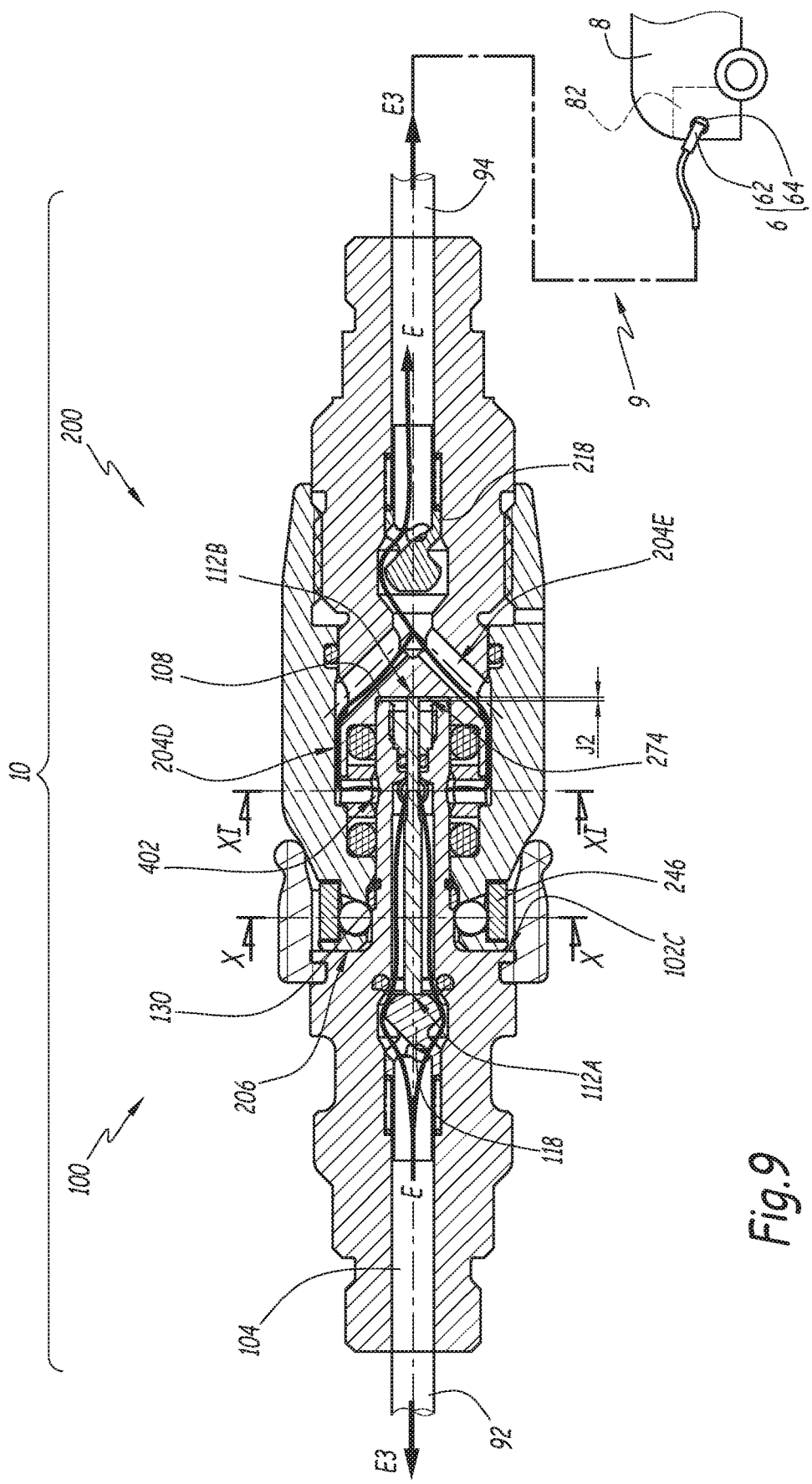
FIG. 9 is a longitudinal sectional view similar to FIG. 5, when the circuit breaker is in the coupled configuration, with its female element connected to a motor vehicle tank making up a fluid storage volume.

For the clarity of the drawing, the elements 4 and 62 of the facility 2 are shown, respectively, only in FIGS. 1 and 9.

The circuit breaker 10 includes a male element 100 and a female element 200.

The male element 100 extends along a longitudinal axis X100 and includes a tubular body 102 made up of a rear part 102A and a front part 102B.

Within the meaning of the present invention, the front of an element of the circuit breaker 10 is the part of this element turned toward the other element of the circuit breaker 10 when these elements are placed across from one another in order to be fitted together. Thus, the front of the male element 100 is oriented toward the right in FIG. 1, while the front of the female element 200 is oriented toward the left in FIG. 3. The rear of an element of the coupling is oriented opposite the front of this element.

The body 102 is shown in one piece in the figures. It may, however, be made up of several assembled parts, in particular by screwing. The body 102 is provided with a surface 102C, which is axial, i.e., perpendicular to the axis X100. The part 102A is located behind the surface 102C, along the axis X100, while the part 102B is located in front of said surface, along said axis.

A central bore 104 extends over the entire length of the male element 100, between its front surface 106, which is annular, flat and perpendicular to the axis X100, and its rear surface 108, which is also annular, flat and perpendicular to the axis X100. One end of the line segment 92 is fastened to the rear of the male body 102 and communicates with the central bore 104. Reference 104B denotes the front end of the central bore 104. A stopper 110 is screwed into said end 104B and is passed through by a rod 112 that protrudes past the front surface 106, outside the body 102. The stopper 110 is part of the body 102. Reference 110B denotes the front surface of the stopper 110 that is continuously passed through by the rod 112.

"Outside" the male body 102 refers to the volume surrounding the male body 102. Thus, the rod 112 is not completely included in the body 102.

Reference 112A denotes the rear end of the rod 112, which is arranged in the bore 104, and reference 112B denotes its front end, which is arranged outside the body 102. The rod 112 is formed by a cylindrical body with a solid circular section, which has a first diameter φ1 at its end 112A and a second diameter φ2, strictly smaller than the diameter φ1, at its front end 112B. The rod 112 includes a transition zone 112C arranged in the bore 104, behind the stopper 110, at which the transition between the diameters φ1 and φ2 takes place.

The body 102 is provided, along the bore 104, with a narrow part 102D that has an inner diameter slightly larger than the diameter φ1.

The portion of the rod 112 located between the part 112C and its front end 112B passes through the stopper 110, which is provided, to that end, with a central bore 110A that makes up a bearing for guiding the sliding of the rod 12 inside the stopper 110, along the axis X100.

Near the part 112C, the male element 100 is provided with two radial passages 116 that connect the bore 104 to the outside of the body 102 when the male element 100 is in the uncoupled configuration. Only one of these radial passages 116 is visible in FIG. 1. Both radial passages are visible in FIG. 6, respectively above and below the rod 112, as well as in FIG. 11, respectively on the left and right of said rod.

The bore 104 includes a wider part 104C, the diameter of which is larger than that of the rest of the bore 104.

A valve 118 is housed in the bore 104, partially at the wider part 104C, behind the radial passages 116, and includes a solid head 118A and a cylindrical body 118B that has a stepped outer surface, with a diameter that decreases toward the rear face 108 of the male element 100. Inclined passages 118C connect a central recess 118D of the cylindrical body 118B with the outer surface of said body, behind the solid head 118A. A spring 120 intercalated, radially with respect to the axis X100, between the cylindrical body 118B and the body 102, pushes back, by default, the valve 118 bearing against a seat 122 formed by an O-ring mounted on the male body 102, inside the bore 104. Thus, in the uncoupled configuration of the circuit breaker, the portion of the central bore 104 located behind the valve 118 is closed off by the valve 118.

In practice, the spring 120 is housed radially between the part of the cylindrical body 118B with the smaller diameter and the body 102. The maximum diameter of the cylindrical body 118B is equal to the inner diameter of the central bore 104, behind its wider part 104C, such that the valve 118 is guided in translation parallel to the axis X100 inside the bore 104.

Figure 2:
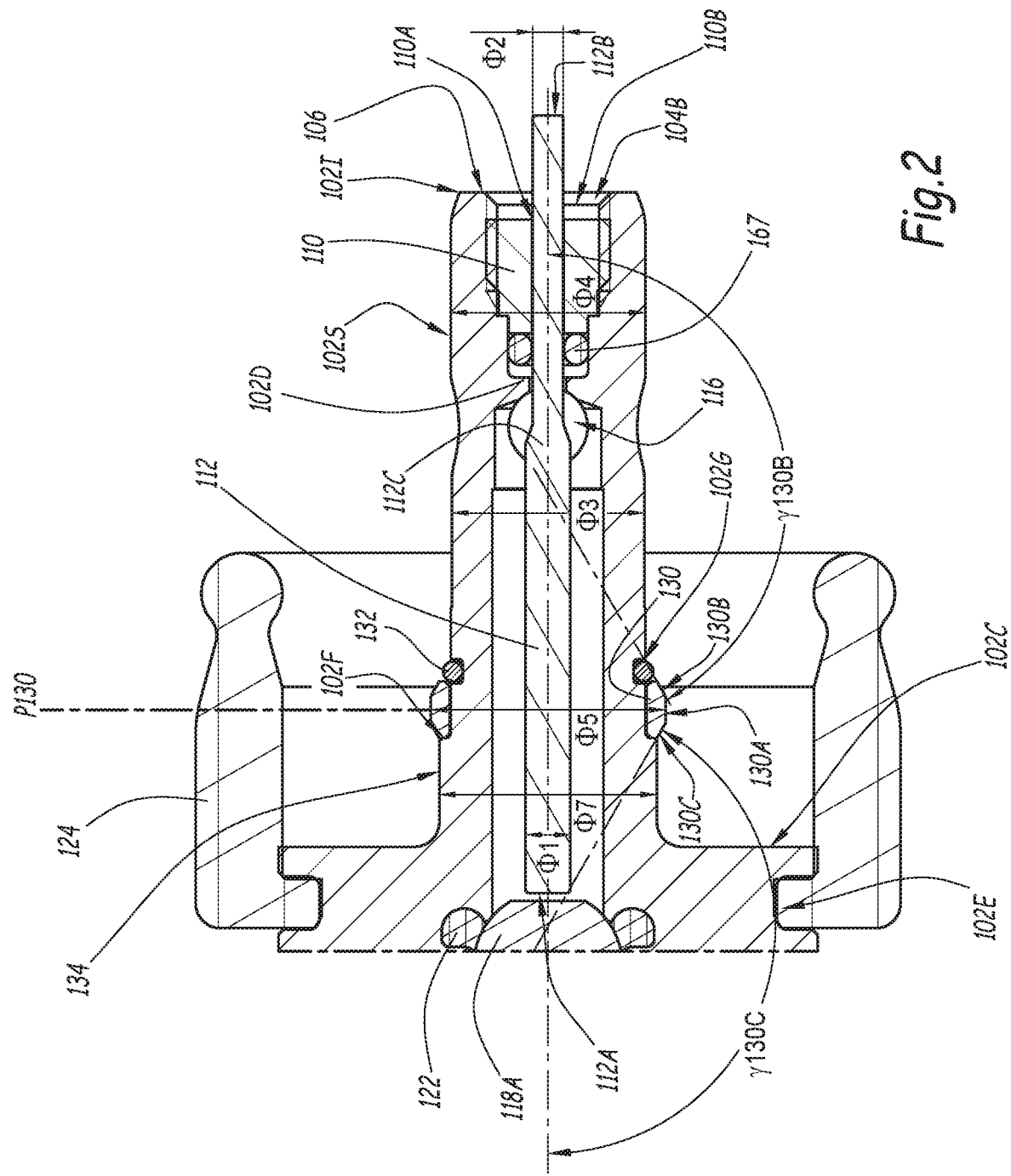
FIG. 2 is an enlarged view of detail II in FIG. 1.

In the uncoupled configuration shown in FIGS. 1 and 2, the rear end 112A of the rod 112 is arranged across from the head 118A. The rod 112 is separate from the valve 118. In other words, the rod 112 and the valve 118 are formed by two different parts able to come into contact with one another. The portion of the rod 112 with diameter φ1 and the narrow part 1020 are kept axially between the solid head 118A and the transition zone 112C.

The front part 102B of the body 102 is tubular, with a circular outer surface, with a variable diameter along the axis X100. More specifically, the front part 102B has two outer radial surfaces with different diameters φ3 and φ4, on either side of the radial passages 116. The diameter φ3 is the outer diameter of the front part 102B, behind the radial passages 116. The diameter φ4 is the outer diameter of the part 102B in front of the radial passages 116, i.e., between these radial passages and the front surface 106 of the male element 100, with which the sealing gasket 268 cooperates in the coupled configuration of the circuit breaker. Reference 102S denotes the outer radial surface of the part 102B, which extends in front of the radial passages 116.

The diameters φ2, φ3 and φ4 are chosen such that the following relationship is verified:

$$\phi 2^2 + \phi 3^2 = \phi 4^2 \qquad \text{(Equation 1)}$$

A deformable protector 124, preferably made from synthetic material, is mounted on the body 102 while being engaged in an outer peripheral groove 102E arranged on the rear part 102A of the body 102. This protector 124 extends, from the groove 102E, toward the front of the element 100 and surrounds the front part 102B, over part of its axial length.

An indexing finger 126 of the male body 102 protrudes forward from the surface 102C, radially between the front part 102B of the body 102 and the protector 124. This indexing finger 126 is in particular visible in FIGS. 6 and 7.

A flange 130 is attached on the outer peripheral surface of the front part 102B of the body 102 while being axially blocked on this front part between a shoulder 102F of the front part and a stop segment 132 formed by a circlips engaged in an outer peripheral groove 102G of the front part.

In practice, the flange 130 is formed by a ring made from a material whose hardness is greater than that of the material used to make up the male body 102 or, when this body is formed from several parts, the front part 102B of this body 102. The material of the body 102 is in turn chosen to be compatible with the gas or gases having to pass through the male element 100, in the example, hydrogen. The hardness of the material of the flange 130 and the hardness of the material of the body 102 are for example measured using the Vickers hardness measurement.

In cross-section shown in FIG. 1, the flange 130 has an outer shape with two bevels that converge moving away from the axis X100, with a cylindrical intermediate part with diameter φ5. In other words, the outer surface of the flange 130 has a cylindrical outer radial surface 130A with a circular section with diameter φ5 and two front 130B and rear 130C frustoconical surfaces on either side of the surface 130A. The surfaces 130B and 130C are symmetrical relative to a median plane P130 of the flange 130. Reference γ130B denotes the incline angle of the frustoconical surface and γ130C denotes the incline angle of the frustoconical surface 130C relative to the longitudinal axis X100, these angles γ130B and γ130C being measured outside the flange 130. These angles are chosen between 140° and 160°, preferably equal to 150°. The values of the angles γ130 are selected based on the direction on which a housing is centered for receiving one or more locking members provided on the female element, as shown by the following explanations. In the example of the figures, the angles γ130B and γ130C have the same value. Alternatively, the angle γ130B is larger than the angle γ130C.

A locking notch 134 is delimited by the outer radial peripheral surface of the front part 102B of the body 102, axially between the surface 102C and the surface 130A of the flange 130. This locking notch 134 has, at the outer peripheral surface of the front part 102B, a diameter φ7 smaller than the diameter φ5.

The female element 200 includes a body 202 that is formed by an inner part 202A and an outer part 202B screwed on the part 202A with insertion of a sealing gasket 210. Although this is not shown in the figures, each of the parts 202A and 202B of the body 202 may be made by several assembled parts, in particular by screwing. The body 202 is centered on a longitudinal axis X200 of the female element 200 that is intended to be aligned with the axis X100 of the male element 100 during fitting and in the coupled configuration of the elements 100 and 200. When the axes X100 and X200 are aligned, together they define a fitting axis X10 of the circuit breaker 10.

The body 202 is provided with a central bore 204 that extends generally along a direction parallel to the axis X200 and that includes a rear portion 204A defined in the inner part 202A and a front portion or end 204B defined in the outer part 202B. One end of the line segment 94 is fastened to the rear of the female body 202 and communicates with the rear portion 204A, as visible in FIG. 9.

References 206 and 208 respectively denote the front and rear surfaces of the female element 200.

A front portion 202C of the outer part 202B is equipped with two housings 240 that pass through it, transversely with respect to the axis X200, all the way through and that are each centered on a transverse axis A240. The two axes A240 converge toward the front of the body 202. Reference α240 denotes the angle between the axis X200, i.e., the axis X10 undergoing fitting and in the coupled configuration, and the axis A240 of a housing 240, the axis α240 being measured on the rear side of the housing 240. The value of an angle α240 is between 60° and 80°, preferably equal to 70°.

The two housings 240 are symmetrical relative to the axis X200 and each accommodate a locking ball 242. The dimensions of each housing 240 transverse to the axis A240 are chosen based on the diameter of the balls 242 in order to be compatible with the movement of the balls transverse to the axis X10 along the axes A240, between an inner radial position and an outer radial position. The housings narrow toward the inside of the body 202, i.e., toward the axis X200, in order to prevent the balls 242 from falling into the front portion 204B of the bore 204.

The respective values of the angles γ130B, γ130C and α240 are chosen based on one another. More specifically, it is preferable for a movement of the balls 242 without jamming in the housing 240 coupling for:

$$a240 + \gamma 130C \geq 200° \qquad \text{(Equation 2)}$$

A resiliently deformable ring 246 is received in an outer slot 248 arranged on the outer radial surface of the front portion 202C of the body 202. The slot 248 delimits a front edge and a rear edge that extend in the radial direction with respect to the axis X200. All of the housings 240 emerge in the slot 248. The resiliently deformable ring 246 surrounds all of the housings 240 and is in contact with all of the balls 242 on which it exerts a centripetal force E1 oriented toward the axis X200. Indeed, the inner diameter of the ring 246, when idle and not mounted on the female body 202, is smaller than the largest diameter of an imaginary cylindrical surface centered on the axis X200 and tangent to the balls 242 in the inner radial position. Preferably, this ring 246 is made from steel. As shown in particular by FIGS. 3 and 4, the ring 246 has a rectangular section in a plane radial to the axis X200.

Figure 10:
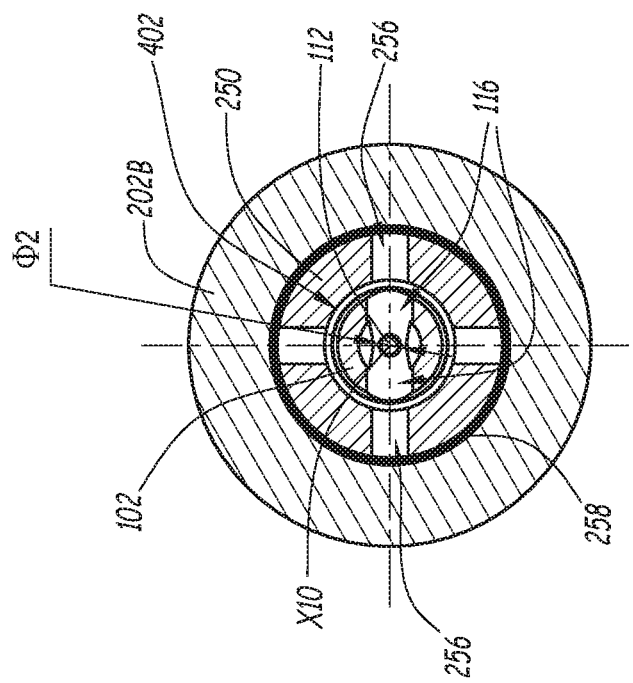
FIG. 10 is a cross-sectional view along line X-X in FIG. 9.

As shown in particular by FIG. 7 and FIG. 10, the slot 248 extends over only part of the periphery of the portion 202C and the ring 246 is a slotted ring, which extends, around the axis X200, over an angular sector whereof the angle β246 is adapted to the position of the housings 240 and the balls 242, on the one hand, and the geometry of the slot 248, on the other hand. In the example where the housings 240 are symmetrical relative to the axis X200, the value of the angle β246 in the retracted configuration of the ring 246 mounted around the balls 242 may be chosen between 210° and 240°, preferably equal to 225°. The angle β246 is chosen to be larger than the angle of an angular sector covering all of the housings 240 and such that the ring 246 in the wider configuration covers all of the housings 240.

The fact that the outer slot 248 only extends over part of the circumference of the front portion 202C makes it possible to lock the rotation of the ring 246 around the axis X200 and to guarantee the contact between said ring 246 and the balls 242 in all of the usage configurations of the circuit breaker 10.

The width l248 of the slot 248 measured parallel to the axis X200 between the front edge and the rear edge is equal to or slightly larger than, to within 10%, the width l246 of the ring 246 measured parallel to the axis X200. The slot 248 makes it possible to guarantee effective guiding of the movement of the ring 246, in a direction radial to the axis X200, and retaining of the ring 246 in the female body 202 along the axis X200, in the uncoupled configuration of the female element, in the coupled configuration of the male and female elements, and when the ring 246 becomes wider or retracts radially to the axis X200, as explained below.

Reference ϕ6 denotes the smallest diameter of an imaginary cylindrical surface centered on the axis X200 and tangential to the balls 242 in the uncoupled configuration of the male 100 and female 200 elements, i.e., when the balls 242 are pushed back by the resiliently deformable ring 246 toward the axis X200, in the inner radial position.

The diameter ϕ6 is smaller than the diameter ϕ5, by at least 10%. In other words, the maximum outer diameter ϕ5 of the flange 130 of the male element 100 is larger than the diameter of the imaginary cylindrical surface defined between the two locking balls 242 in the inner radial position, with the resiliently deformable ring 246 in a retracted configuration where it pushes the locking balls 242 back toward the axis X200.

Conversely, the diameter ϕ6 is strictly larger than the diameters ϕ3 and ϕ4.

Furthermore, the outer diameter ϕ7 of the front part 102B of the body 102 at the notch 134 is substantially equal to the diameter ϕ6.

The body 202 includes a stop ring 250. The stop ring 250 is inserted axially, along the axis X200, between the front portion 202C of the outer part 202B and a front portion 202D of the inner part 202A of the body 202. In practice, the inner part 202A is screwed in the central bore of the inner part 202B, while the stop ring 250 is immobilized axially between a shoulder 202E of the outer part 202B and a front edge 202F of the inner portion 202A. This stop ring 250 is provided with four radial passages 256, distributed at 90° around the axis X200. The inner volume of the stop ring 250 is a volume Va for receiving the male body 102. The radial passages 256 communicate with the outside of the female element 200 at the receiving volume Va when the female element 200 is in the uncoupled configuration.

An annular space 204D is formed around the stop ring 250 and the front portion 202D of the inner part 202A, inside the outer part 202B of the body 202. This annular space 204D is in communication with two inclined passages 204E arranged in the rear part 202B and which connect the annular space 204D to the rear portion 204A of the central bore 204 in which a valve 218 is arranged. The volumes 204D and 204E are part of the central bore 204. The valve 218, like the valve 118, includes a solid head 218A, a stepped cylindrical body 218B, inclined passages 218C and a central recess 218D. A spring 220 pushes back, by default, the valve 218 against a seat 222 arranged in the inner part 202A of the body 202. Like in the male element 100, the valve 218 is arranged in a wider part 204C of the bore 204, with a larger diameter than the rear portion 204A of this bore. The radial passages 256, the annular space 204D, the inclined passages 204E and the inclined passages 218C of the valve 218 and the rear portion 204A communicate when the valve 218 is offset from its seat 222 and form an inner circulation pipe for the fluid in the female body 202.

A first sealing O-ring 266 is housed in the front portion 204B of the central bore 204, in the outer part 202B of the body 202, axially between the front surface 206 and the stop ring 250. A second sealing O-ring 268 is arranged on the other side of the stop ring 250, i.e., axially between this ring 250 and the valve 218.

The sealing gaskets 266 and 268 are identical. They are made from elastomer, and ϕ8 denotes their inner diameter and ϕ9 their toroid diameter, said diameters being measured in the uncoupled configurations of the male and female elements 100 and 200, i.e., when the sealing O-rings 266 and 268 are not constrained by the front part 102B of the body 102.

In the uncoupled configuration of the male 100 and female 200 elements, the sealing gaskets 266 and 268 are exposed, i.e., radially accessible by the inside of the body 202 from the receiving volume Va.

The sealing O-ring 266 is received in a housing 270 arranged inside the outer part 202B of the body 202, defined axially between a shoulder 202G of said body, a front surface 250B of the stop ring 250 and delimited by an outer radial bottom arranged on an inner radial surface of the front part 202B of the body 202. This housing 270 is in the form of an inner peripheral groove centered on the axis X200, and reference P270 denotes its radial depth, i.e., the distance between its outer radial bottom and its inner radial edge. This depth P270 has a value comprised between 75 and 88% of the diameter ϕ9, preferably equal to 85% of this diameter.

Likewise, the second sealing O-ring 268 is arranged in a housing 272, in the form of an inner peripheral groove centered on the axis X200, defined axially between a shoulder 202H of the inner part 202A of the body 202 and a rear face 250A of the stop ring 250 and delimited by an outer radial bottom arranged on an inner radial surface of the rear part 202A of the body 202. Reference P272 denotes the radial depth of this housing 272, defined as the depth P270. The depth P272 has a value comprised between 75 and 88% of the diameter ϕ9, preferably equal to 85% of this diameter.

Furthermore, the ratio ϕ8/ϕ9 is selected with a value below 2.5, preferably below 2.2, more preferably around 2.14 in the uncoupled configuration of the male 100 and female 200 elements.

Each of the first and second sealing gaskets 266 and 268 preferably has a hardness greater than 85 Shore, preferably greater than 90 Shore, having specified that these gaskets may be made from polyurethane.

The inner part 202A of the body 202 is provided with an axial surface 274, in disc form, perpendicular to the axis X200 and centered on the latter, arranged behind the radial passages 256 and sealing gaskets 266 and 268. The sealing gasket 268 is closest to the surface 274. This surface 274 is intended to receive bearing of the front end 112B of the rod 112 during fitting and in the coupled configuration of the male 100 and female 200 elements. Reference d1 denotes the axial distance, measured parallel to the axis X200 between, on the one hand, the surface 274, and on the other hand, a median plane P268 at the gasket 268, perpendicular to the axis X200 and passing through the center of said gasket when it bears against the shoulder 202H, in the uncoupled configuration of the male 100 and female 200 elements.

Furthermore, the body 202 includes a longitudinal slot 226 for receiving the indexing finger 126. Thus, the slot 226 cooperates with the indexing finger 126 in order to index the rotation of the bodies 102 and 202 around the fitting axis X10, when the male 100 and female 200 elements are undergoing fitting or in the coupled configuration.

To perform the fitting of the male 100 and female 200 elements in one another, the axes X100 and X200 are aligned on the fitting axis X10 and the bodies 102 and 202 are oriented around this fitting axis X10 so as to arrange the indexing finger 126 across from the indexing slot 226. The male 102 and female 202 bodies are then brought closer together in axial translation, along the axis X10. This results in introducing the front part 102B of the body 102 into the front portion 204B of the bore 204. Due to this movement, the outer peripheral surface of the front part 102B comes into contact with the sealing O-ring 266, then the second sealing O-ring 268. So-called radial sealing is thus obtained between the male 102 and female 202 bodies, between an inner radial surface of the body 202 making up the bottom of the housing 270 and an outer radial surface of the body 102, via the sealing gasket 266, and between an inner radial surface of the body 202 making up the bottom of the housing 272 and the outer radial surface 102S of the body 102, via the sealing gasket 268.

By continuing the fitting movement, the flange 130 comes across, along the axis X10, from the balls 242. One is then in the configurations of FIGS. 5 to 7, where the flange 130 radially pushes back the balls 242, in a direction centrifugal to the axis X10, against the force E1, which is possible in light of the resiliently deformable nature of the ring 246, which then deforms centrifugally with respect to the axis X10. The balls 242 are thus pushed back, while remaining engaged in the housings 240, along the axis A240, in an outer radial position, where the balls 242 protrude in the slot 248, in order to temporarily increase the value of the diameter φ6 and free a sufficient passage for the male body 102 with the flange 130 in the female body 202. In this configuration, the balls 242 act radially on the ring 246, by direct contact, and the resiliently deformable ring 246 adopts a wider or radially expanded configuration, in which the inner diameter of the ring 246 becomes enlarged relative to the inner diameter of the ring 246 in the uncoupled configuration of the female element 200, allowing the centrifugal movement of the locking balls 242 along the axis A240.

Figure 3:
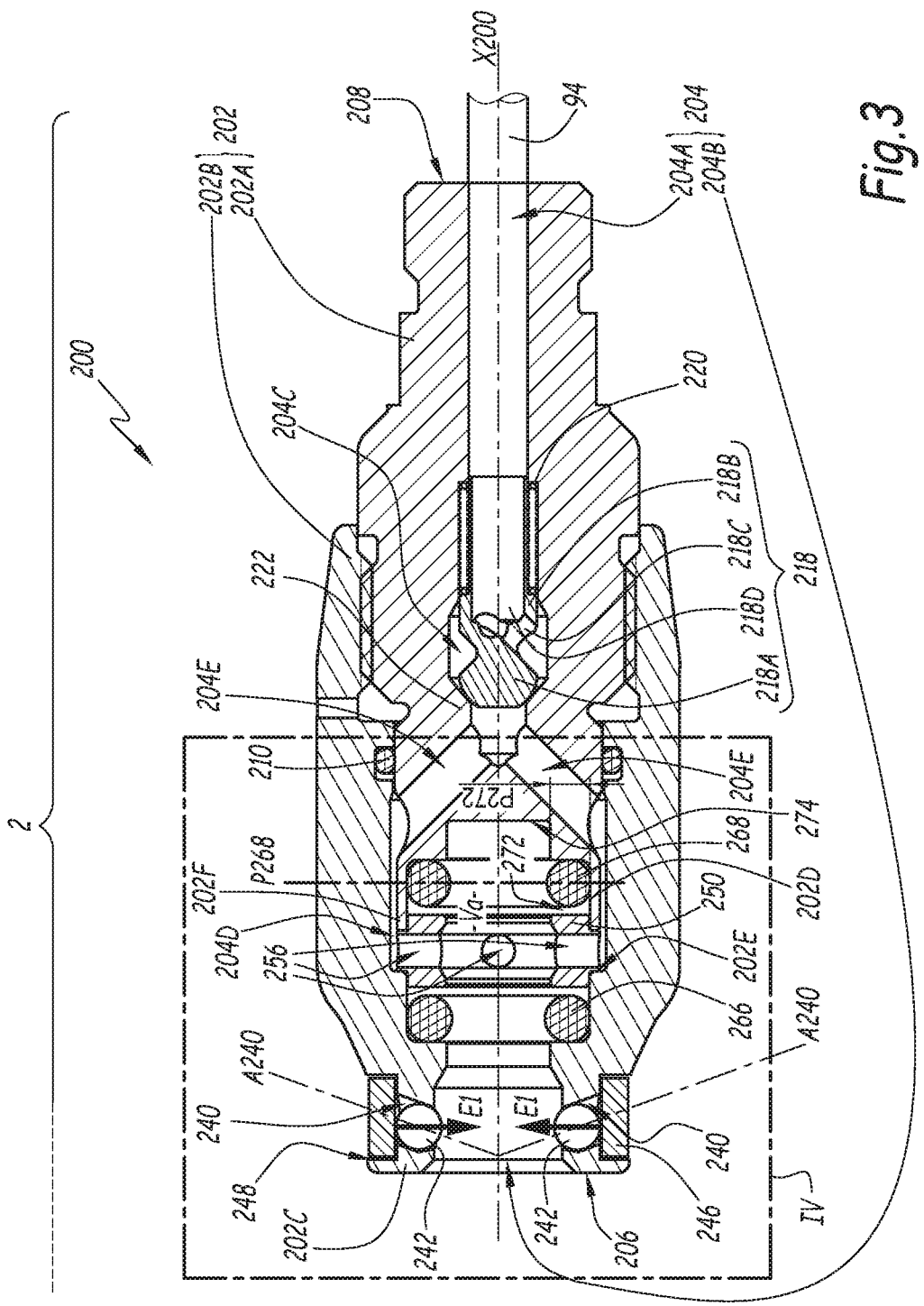
FIG. 3 is a longitudinal sectional view of a female element of the same circuit breaker.
Figure 4:
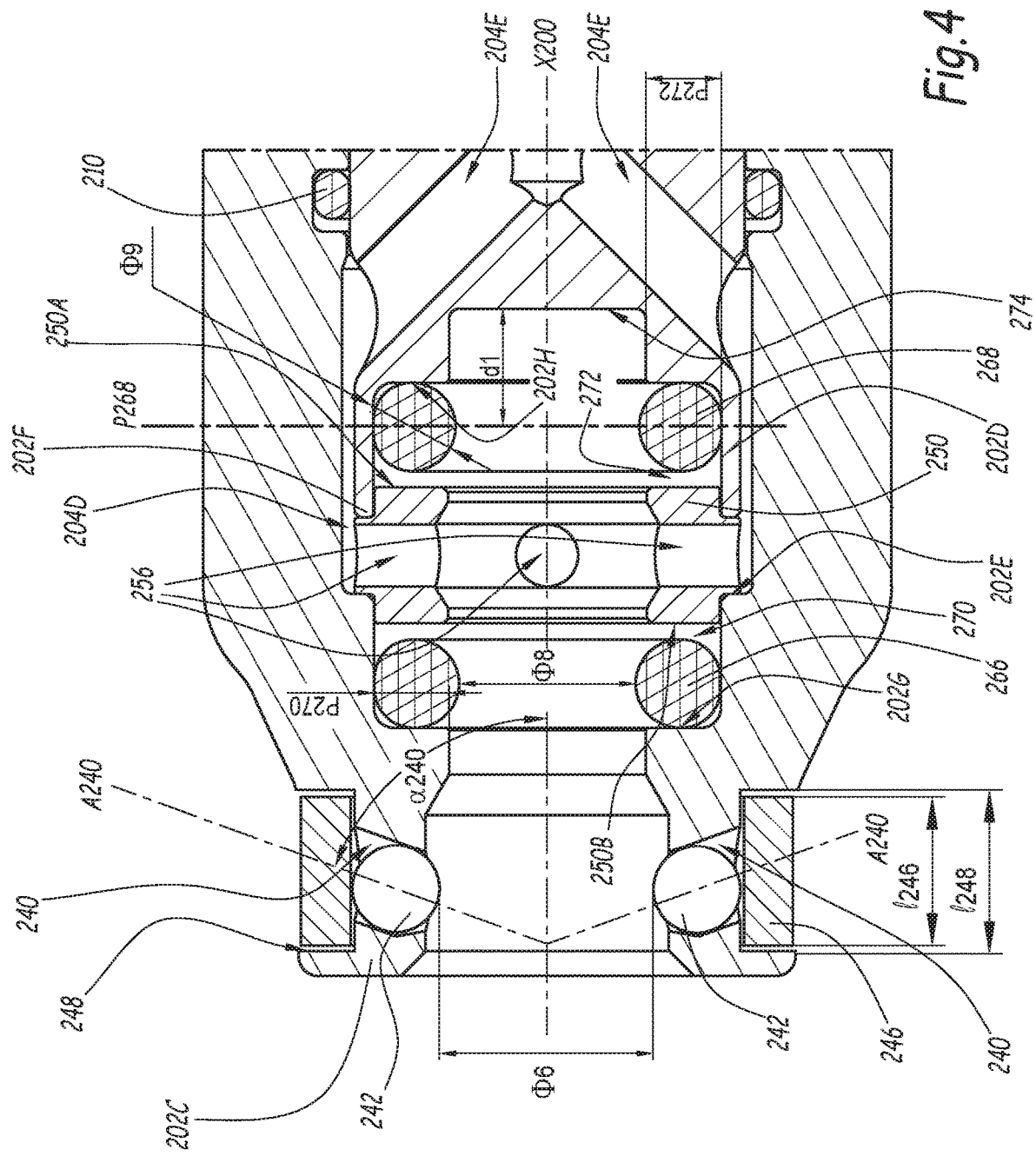
FIG. 4 is an enlarged view of detail IV in FIG. 3.

Between the uncoupled configuration of FIGS. 3 and 4 and the configuration during fitting of FIGS. 5 to 7 where the ring 246 is in contact with the balls 242 in the outer radial position, the resiliently deformable ring 246 remains engaged in the outer peripheral slot 248, while being partially arranged in this slot 248, which implies that it remains guided and axially retained by the axial edges of said slot.

The ring is deformed in direct contact with the balls 242 in all of the configurations of the female element 200.

In this configuration of FIGS. 5 to 7, the end 112B of the rod 112 bears against the surface 274, which forces the rod 112 to withdraw inside the body 102 until its end 112A comes into contact with the head 118A of the valve 118. Reference d2 denotes the axial distance, measured parallel to the axis X10 in the configuration of FIGS. 5 to 7, when the rear end 112A of the rod 112 comes into contact with the head 118A of the valve 118 without unsticking it from its seat 122, between the front end 102I of the outer radial surface 102S of the male body 102, in line with the front surface 106 of the male element 100, and the end 112B of the rod 112. The axial distance d1 is greater than the axial distance d2. As a result, during fitting, the sealing between the male and female elements of the circuit breaker 10, at the outer radial surface 102S of the male body 102, and via the sealing gasket 268, is done before the valve 118 is maneuvered to be opened, i.e., separated from its seat 122, by the rod 112. When the valve 118 is maneuvered to be opened, the sealing between the outer radial surface with diameter φ3 of the male body 102 and the female body 202 of the circuit breaker 10 at the sealing gasket 266 is also effective.

To facilitate the fitting of the male and female elements 100 and 200 in one another, an outer peripheral groove 176 is provided on the male body 102, while the female body 202 is provided with two inclined slots 276, only one of which is visible in FIG. 8, but which are both visible in section in FIG. 6. These two inclined slots 276, which in practice are arranged on the outer peripheral surface of the outer part 202B of the body 202, allow the placement of a tool 300 that includes two arms 302, the ends 302A of which catch in the slots 276, as well as a bent central part 304 configured to be engaged in the groove 176 while bearing against a side 176B of this groove delimiting the latter toward the front of the male body 102. Thus, by exerting a tilting force of the tool 300 around the ends 302A in the direction of the arrow µl in FIG. 8, it is possible to exert, on the side 176B of the groove 176, an axial force E2 oriented toward the body 202 of the female element 200. The tool 300 therefore makes it possible to reduce the force exerted by the operator on the tool 300 in terms of fitting force of the male 100 and female 200 elements in one another.

However, the use of the tool 300 is not mandatory. This tool may be omitted if the operator is capable of exerting a sufficient fitting force to push the balls 242 radially back into the housings 240, against the resilient force E1 exerted by the ring 246, and move the rod 112 toward the inside of the body 202, until unsticking the valve 118 from the seat 122. In this case, the groove and slots 176 and 276 can be omitted.

During the fitting movement, the protector 124 comes into contact with the outer surface of the part 202B of the body 202 while flaring via a resilient deformation. In this configuration, the protector 124 isolates the slot 248 and the resiliently deformable ring 246 from the outside, which prevents the pollution of these parts by outside elements and guarantees proper operation of the circuit breaker 10 in this respect. Radial play J1 of about 1 mm is arranged between the ring 246 in the wide configuration and the protector 124, which prevents the protector 124 from opposing the centrifugal resilient deformation of the ring 246 when the locking balls 242 move toward their outer radial position, when the obstacle formed by the flange 130 passes.

During the fitting movement, the movement of the valve 118 under the action of the rod 112 is guided by the cooperation of the outer radial surface with the larger diameter of the cylindrical body 118 and the bore 104.

Once the valve 118 is unstuck from its seat 122 during fitting, the pressurized fluid can flow through the bore 104, passing through the passages 118C of the valve 118, then circulating inside the bore 104, around the rod 112, until passing through the radial passages 116, which are partially aligned, radially with respect to the axis X10, with two of the four radial passages 256, this radial alignment being provided by the cooperation of the indexing FIG. 126 with the indexing slot 226. The bore 104 behind the stopper 110, the passages 118C, the radial passages 116 form an inner fluid circulation pipe in the male body 102. The pressurized fluid can then flow from the radial passages 116 into an annular space 402 defined between the male body 102 and the female body 202, this annular space 402 being axially closed off by the sealing gaskets 266 and 268 arranged on either side of the radial passages 116 and 256 along the axis X10. Thus, in the coupled configuration, the sealing gasket 266 is arranged on one side of the radial passages 116 and 256 along the axis X10, while the sealing gasket 268 is arranged on the other side of the radial passages 116 and 256 along the axis X10. From the annular space 402, the pressurized fluid can then flow toward the radial passages 256, then in the annular space 204D and in the inclined passages 204E. The pressure of the fluid arriving through the inclined passages 204E makes it possible to push back the valve 218 against the force exerted by the spring 220, which frees the passage toward the back of the bore 204.

Once the flange 130 has axially exceeded the locking balls 42 due to the continued fitting movement, the force E1 exerted by the resiliently deformed ring 246 radially pushes back the balls 242 toward the fitting axis X10 along the axis A240, which results in pushing back these balls toward their inner radial position in the locking notch 134. The ring 246 regains a retracted configuration relative to the wide configuration and keeps the locking balls 242 in the locking notch 134. One is then in the coupled configuration of the elements 100 and 200 shown in FIGS. 9 to 11. The locking balls 242, engaged in the notch 134 under the force E1 of the resilient ring 246, axially lock the male body with the female body, i.e., form an obstacle to a withdrawal of the male body 102 outside the female body 202 by abutment against the surface 130C of the flange 130 as long as the withdrawal force is lower than the force necessary to widen the ring 246.

In the coupled configuration, the front surface 206 of the body 202 makes up an axial stop surface for the male body 102 in the fitting direction, the front surface 206 cooperating with the surface 102C of the male body 102, while the balls 242 have no axial stop against the body 102 in the fitting direction. Thus, the forces tending to bring the male 102 and female 202 bodies into the coupled configuration are not absorbed by the balls 242 and do not stress the resiliently deformable ring 246.

Figure 11:
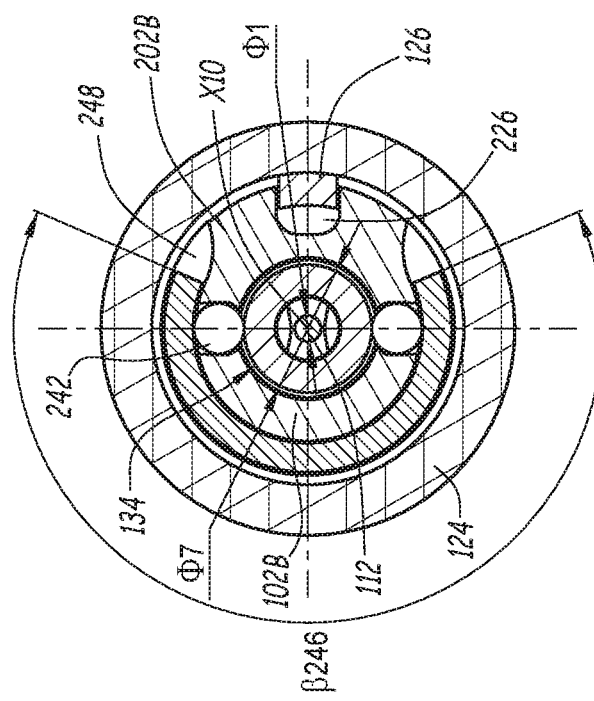
FIG. 11 is a cross-sectional view along line XI-XI in FIG. 9.

In the coupled configuration of FIGS. 9 to 11 reached at the end of the fitting of the male and female elements, the pressurized fluid can circulate through the circuit breaker 10, from the line segment 92 toward the line segment 94, as shown by the flow arrows E in FIG. 9.

It will be noted in FIG. 9 that in the coupled configuration of the male 100 and female 200 elements, the axial surface 102C of the male element abuts against the front surface 206 of the female element, which limits the penetration of the front part 102B of the body 102 toward the bearing surface 274. Thus, in this configuration, axial play J2 exists between the front surface 106 of the male element 100 and the surface 274, the end 112B of the rod 112 then protruding slightly from the surface 106, while bearing against the surface 274.

In this configuration, the radial passages 116 and 256 are completely aligned with one another, along the fitting axis X10.

Once the pressurized fluid passes through the circuit breaker 10, from the line segment 92 toward the line segment 94, therefore in particular in the coupled configuration, the male body 90 is balanced, in terms of pressure, with respect to the outside of the circuit breaker, despite the high pressure of the transiting fluid.

Indeed, the sealing between the rod 112 and the male body 102 is produced at the contact of a third sealing O-ring 167, this third sealing O-ring being mounted axially between the narrow part 102D and the stopper 110. At this third sealing gasket 167, the sealing section S2 between the third sealing gasket 167 and the rod 112 is expressed in the form:

$$S2 = \pi \times \phi 2^2 / 4. \qquad \text{(Equation 3)}$$

Furthermore, the sealing is also obtained at the contact of the gaskets 266 and 268 with the outer peripheral surface of the front part 102B of the body 102.

At the first sealing gasket 266, the sealing section S3 between the first sealing gasket 266 and the male body 102 is expressed in the form:

$$S3 = \pi \times \phi 3^2 / 4 \qquad \text{(Equation 4)}$$

At the second sealing gasket 268, the sealing section S4 between the second sealing gasket 268 and the male body 102 is expressed in the form:

$$S4 = \pi \times \phi 4^2 / 4 \qquad \text{(Equation 5)}$$

In light of the relationship expressed by equation 1, one has the relationship:

$$S4 = S2 + S3. \qquad \text{(Equation 6)}$$

In other words, no force is exerted separating the body 102 relative to the body 202, due to the pressure of the pressurized fluid that passes through the body but that is not exerted outside the circuit breaker. The resilient force exerted by the spring 120 tends toward this separation, but this resilient force is not dependent on the pressure of the pressurized fluid and may be calibrated by a careful choice of the spring 120.

The rod 112, the stopper 110 and the third sealing gasket 167 close off the central bore 104 on the front of the male body 102 in the direction of the longitudinal axis X1. In other words, the rod 112, the stopper 110 and the third sealing gasket 167 close off the axial end 1048 of the central bore 104.

In case of moderate separating force of the male 100 and female 200 elements along the axis X10, the flange 130 does not manage to deform the ring 246 and the balls 242 remain engaged in the locking notch 134 and the circuit breaker withstands this force.

If the vehicle 8 is moved, while the parts 62 and 64 of the coupling 6 are coupled, an emergency uncoupling of the male 100 and female 200 elements occurs. The line segments 92 and 94 are first stretched and the male element 100 arrives at a maximum distance from the terminal 4. From this moment, a pulling out force E3 is exerted between the male and female elements of the coupling, parallel to the axis X10. This pulling out force E3 results in bringing the locking balls 242 into contact with the flange 130. If it is intense enough, i.e., if it allows the ring 246 to deform, this pulling out force E3 results in sliding or rolling the balls 242 against the frustoconical surface 130C of the flange 130 oriented toward the surface 102C, which results in pushing the balls 242 back in a centrifugal direction with respect to the axis X10, inside the housing 240 along the axis A240. On this occasion, the ring 246 deforms resiliently, radially outward, i.e., in a centrifugal direction relative to the axis X10, to accommodate this movement of the balls 242 from their first inner radial position inside the locking notch 134 toward a second outer radial position bearing on the outer peripheral surface 130A of the flange 130 and compatible with the withdrawal of the male element relative to the female element. In this case, the pulling out force E3 makes it possible to separate the male and female elements 100 and 200 from one another, without breaking the line segments 92 and 94.

During this separating movement, the bearing surface 274 gradually moves away from the front surface 106, which allows the rod 112 to slide toward the right in FIG. 9, while being pushed back by the valve 118 subject to the action of the spring 120. In other words, during the withdrawal of the body 102 with respect to the body 202, the valve of the male element is gradually closed, which cuts off the circulation of fluid within the facility 2. When the circulation of pressurized fluid is cut off in the male element, the valve 218 closes under the effect of the spring 220.

Furthermore, a nonreturn valve, not shown, is integrated into the line segment 94 or the gun 162, in order to prevent pressurized fluid from rising from the tank 82. In case of emergency uncoupling of the male 100 and female 200 elements considered above, the portion of the line 9 comprised between this nonreturn valve and the valve 218 of the female element 200 is purged through an exhaust pipe 278 that connects the wide part 204C of the bore 204 with a vent 280 arranged in the inner part 202A of the body 202, this vent 280 connecting the exhaust pipe 278 to the surface 274, which communicates with the outside of the body 202 when the female element is uncoupled and to a rear volume V202 of the body 202 in communication with the outside of the body 202. This vent also makes it possible to discharge the air captured between the surfaces 106 and 274 during the fitting of the male 100 and female 200 elements in one another.

When an operator wishes to uncouple the male 100 and female 200 elements from the circuit breaker 10, in particular for a maintenance operation, he must exert, on the male and female bodies 102 and 202, a sufficient separating force, parallel to the aforementioned force E3, to allow the locking balls 242 to expand the resiliently deformable ring 246 radially, centrifugally relative to the fitting axis X10. In other words, the uncoupling initiated by an operator takes place according to a sequence comparable to the emergency uncoupling considered above. When the male element 100 is outside the female element 200, the ring 246 pushes the balls 242 back into the inner radial position.

According to an advantageous aspect of the invention, but which is not shown, it is possible to provide a tool that engages in an outer slot of the female body and in an outer groove of the male body, in particular the volumes 176 and 276, in order to reduce the force exerted in this case by the operator for the relative separation of the two male 102 and female 202 bodies along the axis X10.

In the second embodiment of the invention shown in FIGS. 12 to 15, the parts of the circuit breaker 10 similar to those of the first embodiment bear the same references. This circuit breaker may be integrated into the facility of FIGS. 1 to 11.

Below, we describe primarily what differs from the preceding embodiment.

In this embodiment, it is the female element 200 that is connected to the terminal 4, while the male element 100 is connected to the gun 62. The upstream 92 and downstream 94 line segments are therefore respectively connected to the female element 200 and the male element 100. The bore 204 passes all the way through the inner part 202A of the body 202 along the axis X200.

The body 202 of the female element 200 defines a volume Va for receiving the body 102 of the male element in the coupled configuration of these elements.

The valve 218 of the female element forms a single piece with a rod 212 that passes through the inner part 202A of the body 202 and the axial surface 274, and the front end 212B of the rod 212 protrudes past the axial surface 274 of the body 202 defined as in the first embodiment, in the uncoupled configuration and in the coupled configuration of the circuit breaker. A gasket 267 is mounted in the inner part 202A of the body 202, between two narrow parts of said body, and produces a sealing surface around a portion of the rod 212, the diameter of which is denoted $\phi 2'$.

Furthermore, the front part 102B of the body 102 has a circular section and has two diameters $\phi 3'$ and $\phi 4'$, respectively behind and in front of two coaxial radial passages 116 that connect a central bore 104 of the male element 100 to the outside thereof in the uncoupled configuration. The front end of the central bore 104 is closed off on the front of the male body 102, by a solid head 102H of the male body 102.

Figure 15:
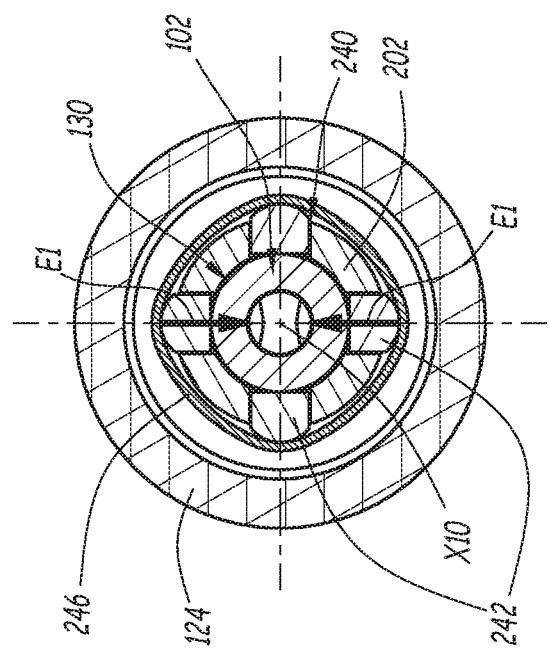
FIG. 15 is a cross-sectional view along line XV-XV in FIG. 14.

In the coupled configuration of the circuit breaker 10 shown in FIGS. 14 and 15, a first sealing gasket 266 and a second sealing gasket 268 bear sealably against the portions of the front part 102B of the body 102 with diameter $\phi 3'$, $\phi 4'$, respectively.

Reference S2 denotes the sealing section between the sealing gasket 267 and the rod 212, S3 the sealing section between the sealing gasket 266 and the male body 102 and S4 the sealing section between the sealing gasket 268 and the male body 102, respectively, these sections being expressed as a function of the diameters $\phi 2'$, $\phi 3'$ and $\phi 4'$ by transposition of equations 3, 4 and 5.

Like in the first embodiment, one has the relationships:

$$\phi 2'^2 + \phi 3'^2 = \phi 4'^2 \quad \text{(Equation 7)}$$

$$S4 = S2 + S3 \quad \text{(Equation 8)}$$

Thus, in the coupled configuration of the circuit breaker 10, the body 102 of the coupling element 100 is balanced with respect to the outside of the circuit breaker 10 despite the pressure of the fluid passing in the body 102.

In this embodiment, the flange 130 is not made up of an attached part, but by a portion of the front part 102B of the body 102 that is a single part with this front part. Like the flange 130 of the first embodiment, the flange 130 of this second embodiment includes a cylindrical outer peripheral surface 130A with a circular section as well as two cone trunk sections 130B and 130C.

The locking members are made up of four locking segments 242 regularly distributed around the axis X10 and subject to a resilient and centripetal force E1 exerted by a resiliently deformable ring 246 that extends over 360° around a front portion 202C of the outer part 202B of the body 202.

The housings 240 of the locking segments 242 in the body 202 extend along a radial direction with respect to the longitudinal axis X2.

In section in a plane radial to the fitting axis X10, the locking segments 242 have a polygonal section with an inner radial edge 242A parallel to the axis X10 and two rear 242B and front 242C inclined edges respectively parallel or nearly parallel to the surfaces 130B and 130C. This facilitates the sliding of the segments 242 on the flange, respectively during the fitting and uncoupling of the male 100 and female 200 elements.

The ring 246 is continuous, i.e., it is annular and surrounds the segments 242 over 360° around the axes X200 and X10.

The continuous geometry of the ring 246 requires mounting it via the front of the female body 202. Instead of a slot like the slot 248 of the first embodiment, a stop segment 232 is used that limits the axial movements of the ring 246 relative to the body 202, in cooperation with a shoulder 202I of the body 202. The stop segment 232 and the shoulder 202I make up the two axial edges of a slot 248 arranged at the outer radial surface of the body 202 and that axially retains the ring 246 relative to the female body 202 between the wider configuration and the retracted configuration of the ring 246.

During fitting, the front surface 106 of the body of the male element 100, which is in the form of a disc perpendicular to and centered on the fitting axis X10, comes into contact with the front end 212B of the rod 212 after the sealing is effective between the male 102 and female 202 bodies, at the sealing gaskets 266 and 268.

The front surface 106 next exerts a force that pushes the valve 218 back against a resilient force exerted by a spring 220. This makes it possible to open the valve 218 and allows pressurized fluid to circulate from the rear part 204A of a central bore 204 of the body 202, to come into the inclined passages 204E, to come into an annular space 204D, which both belong to the central bore 204, then into radial passages 256 of a stop ring 250, into the radial passages 116 and into the central bore 104 of the body 102 of the male element 100. The pressure from the fluid arriving through the radial passages 116 is sufficient to push back the valve 118 against a resilient force exerted by a spring 120. This makes it possible to establish the circulation of fluid inside the circuit breaker 10, as shown by the flow arrows E in FIG. 14.

Figure 13:
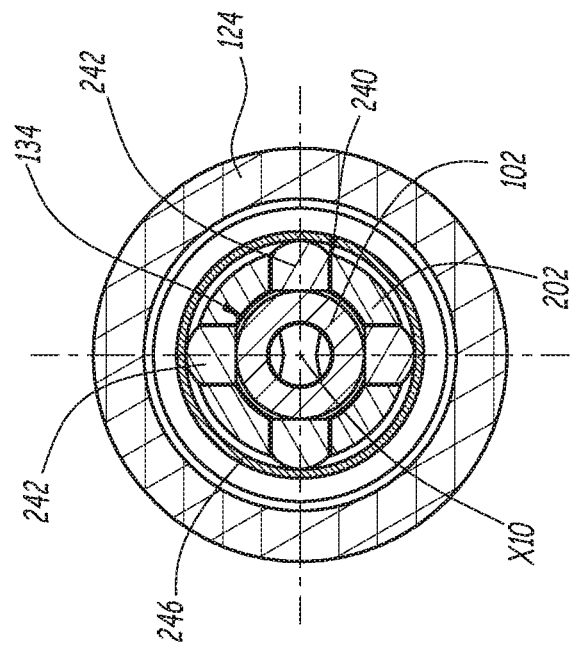
FIG. 13 is a cross-section along line XIII-XIII in FIG. 11.

In terms of fitting and uncoupling, the operation of the circuit breaker 10 of this second embodiment is comparable to that of the first embodiment. Upon fitting, the flange 130 pushes back blocking segments 242 against the resilient force E1 exerted by the resiliently deformable ring 246, while deforming the ring 246 centrifugally with respect to the axis X10, as shown in FIGS. 12 and 13, up to its wide configuration. The blocking segments 242 are next pushed back by the ring 246 into the locking notch 134. During emergency uncoupling, the withdrawal force causes the locking segments 242 to be moved axially, up to around the flange 130 by deforming the ring 246, which then widens radially centrifugally relative to the fitting axis X10, until the locking segments 242 leave the locking notch 234 and thus free the body 102 of the male element 100 with respect to the body 202 of the female element 202.

In the coupled configuration of FIGS. 14 and 15, the front surface 206 of the body 202 bears against an axial surface 102C of the body 102, defined like in the first embodiment, without the front surface 106 of the male element 100 bearing against the surface 274. Axial play J2 therefore remains between the surfaces 106 and 274 in the coupled configuration.

In this embodiment, the actuating rod 212 is a single piece with the valve 218. This could also be the case for the actuating rod 112 and the valve 118 of the first embodiment.

The present invention has many advantages.

The resilient radial deformation of the resilient ring 246 between the wide configuration in contact with the locking members in the inner radial position and the retracted configuration in contact with the locking members in the outer radial position allows, on the one hand, automatic locking of the male and female elements of the circuit breaker 10, owing to an essentially axial maneuver during the fitting, and an automatic unlocking of these elements, whether this locking is emergency or voluntary unlocking, also owing to an essentially axial maneuver.

The circuit breaker 10 is compact, in particular in a direction parallel to the axis X10.

The type of locking obtained is compatible with the high pressures used in facilities for handling pressurized fluid, since the male body 102 has two sealing sections S3 and S4, on either side of the radial passages for the fluid 116 and 256, which makes it possible to decrease the effects of the pressure on the male body 102.

During the fitting and uncoupling of the male and female elements, as well as in the coupled configuration, the male body 102 passed through by the pressurized fluid may be balanced, as shown by the relationship between the sealing sections S2, S3 and S4 mentioned in equations 6 and 8.

The sealing is done in line with the first and second seals 266 and 268 before opening the valve 118 and before locking the male and female elements in one another. Thus, once the fluid circulates in the male body 102 and once the locking is in place, the pressure of the fluid does not affect the locking force, which is compatible with an axial maneuver. This is valid for both embodiments. In the first embodiment, during fluid distribution, from the terminal 4 toward the gun 62, the male body 102 is balanced and the pressure does not exert any unlocking force on the locking members 242. In particular, the uncoupling force is independent of the pressure of the fluid passing through the circuit breaker 10, which reliabilizes the operation of said circuit breaker.

The protector 124 protects the resilient ring 248 in the coupled configuration, which limits the risks of dust bothering the radial deformation of the resilient ring 246 and the operation of the circuit breaker.

The actuating rod 112 or 212 advantageously replaces the sleeve of EP-A-0,900,966.

If the actuating rod 112 is separate from the valve 118, the operation of the circuit breaker is reliabilized, since one avoids stacking of allowances or jamming of the valve 118.

Irrespective of the operating mode, the front end 112B or 212B of the actuating rod remains outside the body 102 or 202 at all times. In particular, the front end 112B or 212B remains in front of an axial surface of the body 102 at all times, formed by the front surface 110B of the stopper 110 in the first embodiment or by the axial surface 274 of the body 202 in the second embodiment, axial surface through which the rod passes, which avoids hindering the radial centering of the male body 102 in the two sealing gaskets 266 and 268.

In the first embodiment, the slotted ring 246 allows easy mounting of the balls 242 in their respective housings 240, as well as easy mounting of said slotted ring on the female body 202. Since the slotted ring can be chosen in a material harder than a simple resilient ring, its lifetime may be increased.

Still in the first embodiment, the balls 242 have a geometry that limits the risks of jamming, which guarantees a good operation of the circuit breaker. The tilted nature of the housings 240 of this first embodiment makes it possible to differentiate the separating force E3, which results from an emergency uncoupling, from the locking force. The locking force may be lower than the emergency uncoupling force and the unlocking force.

In the first embodiment, since the diameters φ3 and φ4 are strictly smaller than the diameter φ6 of the balls in the inner radial position and since the flange 130, which is attached on the body 102, can be made from an appropriate material, the balls are only in contact with the flange 130 during coupling/uncoupling maneuvers, which prevents the sealing surfaces provided on the male body 102 from being destroyed by the friction from the balls 242.

In the first embodiment, the taking into account of the sealing of the rod at the gasket 167 in order to balance the male body 102 makes it possible to guarantee an uncoupling force related solely to the pulling force exerted on the male and female elements 100 and 200 of the circuit breaker 10 and to avoid untimely uncouplings.

The geometry of the gaskets 266 and 268 and their housing 270 and 272, in particular the values of the ratios φ8, φ9, P270/φ9 and P272/φ9, prevents these gaskets from being ejected under pressure, upon fitting or during uncoupling. This is valid for both embodiments.

The part of the circuit breaker 10 that is equipped with the actuating rod, namely the male element 100 in the first embodiment and the female element 200 in the second embodiment, is preferably placed on the side of the pressurized fluid source, i.e., the upstream side relative to the circulation direction of the pressurized fluid, since, because this rod protrudes outside the body that it passes through, this rod is relatively fragile and could be altered if this element were to be dragged on the ground by a vehicle. In the first embodiment, the sealing surfaces on the body 102, which are not protected, are not dragged on the ground by a vehicle during the emergency uncoupling and the sensitive surfaces of the female element 200 are protected during the uncoupling, since they are instead located inside the body 202.

Alternatively, the passages 116 and 256 described as extending radially may be transverse to the longitudinal axis X100, X200, respectively.

The features of the embodiments and alternatives considered above can be combined to create new embodiments of the invention.

The invention is described above in reference to a facility for providing pressurized hydrogen for a motor vehicle. It is, however, understood that other applications may be considered for the circuit breaker according to the invention, in particular transferring pressurized gaseous helium.

The invention claimed is:

1. A circuit breaker for connecting two line segments of a facility for handling pressurized fluid, the circuit breaker comprising:
    a male element and a female element that are intended to fit in one another along a fitting axis, the male element including a male body defining a first inner pipe for circulating pressurized fluid and provided with
        at least one member for closing off a front end of the first inner pipe along the fitting axis,
        at least one first passage, radial with respect to the fitting axis and connecting the first inner pipe to the outside of the male body in an uncoupled configuration of the male element and the female element of the circuit breaker, and
        a locking notch arranged on the male body
    the male element provided with a valve, the valve of the male element movable in the first inner pipe relative to the male body,
    the female element including a female body defining a second inner pipe for the circulation of pressurized fluid and provided with
        at least one second passage, radial with respect to the fitting axis and connecting the second pipe to a volume receiving the male body in the female body, and
        several locking members movable transversely with respect to the fitting axis, in housings of the female body, between a first radial position, where the locking members are engaged in the locking notch, for the axial locking of the male body with the female body in a coupled configuration of the male element and the female element of the circuit breaker, and a second radial position, where the locking members free the passage of the male body in the female body,
    the female element provided with a valve, the valve of the female element movable in the second inner pipe relative to the female body,
        wherein, in the coupled configuration, the first and second radial passages are in communication, while a first sealing gasket and a second sealing gasket are arranged, along the fitting axis, on either side of the first and second radial passages and respectively cooperate radially with the male body and the female body,
        wherein a resilient return ring is mounted on the female body and surrounds the locking members, the resilient return ring configured to resiliently return the locking members toward the first radial position in the coupled configuration and to be deformed radially, and resiliently, by the locking members during movement thereof, from the first radial position toward the second radial position, and
        wherein the circuit breaker includes a rod for maneuvering a first valve from among the valve of the male element and the valve of the female element, the rod passing through a first body, formed by the male body or the female body and housing the first valve, with interposition of a third sealing gasket between the first body and the rod, the rod slidably mounted in the first body along a direction parallel to the fitting axis, and wherein a second body, from among the male body and the female body, defines a bearing surface of the rod, the bearing surface being stationary with respect to the second body and configured to push the rod toward a rear of the first body, during fitting of the male element and the female element, to move the first valve from a closed position to an open position of an inner pipe of the first body.

2. The circuit breaker according to claim 1, wherein the rod is separate from the first valve that it maneuvers.

3. The circuit breaker according to claim 1, wherein, in the uncoupled configuration and in the coupled configuration of the circuit breaker, a front end of the rod extends, along the fitting axis, toward a front of the first body and past a surface of the first body that the rod passes through.

4. The circuit breaker according to claim 1, wherein, in the coupled configuration, the first sealing gasket is arranged more in front of the female body than the second sealing gasket, while a sealing section between the second sealing gasket and the male body is equal to the sum of a sealing section between the first sealing gasket and the male body and a sealing section between the third sealing gasket and the rod.

5. The circuit breaker according to claim 1, wherein the first sealing gasket and the second sealing gasket are each received in an inner peripheral groove of the female body and in that the rod actuates the valve of the male element.

6. The circuit breaker according to claim 5, wherein a first distance, measured axially between the bearing surface and the gasket closest to said surface, among the first sealing gasket and the second sealing gasket is greater than a second distance, measured axially between a front end of the outer radial surface of the male body and a front end of the rod, when the rod is in contact with the valve of the male element without separating it from its seat.

7. The circuit breaker according to claim 1, wherein the first sealing gasket and the second sealing gasket are O-rings, and
wherein for each of the first sealing gasket and the second sealing gasket, a ratio between a gasket inner diameter of this gasket in the uncoupled configuration of the circuit breaker and a toroid diameter is smaller than 2.5.

8. The circuit breaker according to claim 7, wherein the ratio between the gasket inner diameter in the uncoupled configuration of the circuit breaker and the toroid diameter is smaller than 2.2.

9. The circuit breaker according to claim 1, wherein, between a first configuration of the resilient return ring in contact with the locking members in the first radial position and a second configuration of the resilient return ring in contact with the locking members in the second radial position, the resilient return ring is retained axially in a slot arranged at the outer radial surface of the female body and delimited by two axial edges.

10. The circuit breaker according to claim 1, wherein the resilient return ring is a slotted ring that acts on two locking members movable in two symmetrical housings relative to the fitting axis.

11. The circuit breaker according to claim 1, wherein the locking members are locking balls.

12. The circuit breaker according to claim 1, wherein the locking members are received in housings each of the housings centered on an axis transverse to the fitting axis, in that the transverse axis of each of the housings converges toward a front of the female body and
wherein an angle between the fitting axis and the transverse axis of each of the housings, measured on a rear side of each of the housings, is between 60° and 80°.

13. The circuit breaker according to claim 12, wherein the angle between the fitting axis and the transverse axis of each of the housings is 70°.

14. The circuit breaker according to claim 1, wherein the locking notch is delimited, along the fitting axis, on a side of the male body, by a first frustoconical surface of a flange, and wherein an incline angle of the first frustoconical surface relative to the fitting axis, measured outside the flange, is between 140° and 160°.

15. The circuit breaker according to claim 14, wherein the incline angle is 150°.

16. The circuit breaker according to claim 1, wherein, in the coupled configuration of the male element and the female element, the female body constitutes an axial stop surface for the male body, in a fitting direction.

17. A facility for handling pressurized fluid, comprising:
a pressurized fluid source and a first part of a coupling intended to be coupled to a second coupling part, the second coupling part connected to a storage or usage volume of the pressurized fluid, the first part of the coupling being fluidly connected to the pressurized fluid source by a line, wherein a circuit breaker according to claim 1 is fluidly connected to the pressurized fluid source by a first segment of the line and to the first part of the coupling by a second segment of the line.

* * * * *